April 30, 1935.   C. O. WOLD   1,999,226
ROAD MACHINE
Filed Jan. 7, 1932   5 Sheets-Sheet 5

INVENTOR.
CARL O. WOLD
BY
ATTORNEY.

Patented Apr. 30, 1935

1,999,226

UNITED STATES PATENT OFFICE 1,999,226

ROAD MACHINE

Carl O. Wold, Minneapolis, Minn., assignor to Caterpillar Tractor Co., San Leandro, Calif., a corporation of California Application January 7, 1932, Serial No. 585,271

29 Claims. (Cl. 37—156)

This invention relates to road machines and particularly to a machine which has proven useful in establishing and maintaining a road surface.

It is an object of the invention to provide a machine for planing a road surface.

Another object of the invention is to provide a machine capable of planing a road surface, and thereafter spreading planed road-surface material at a selected depth and in a selected direction over the road.

Another object of the invention is to provide a machine in which a plurality of planing edges are positioned, so that the cut of one edge can selectively lap the cut of another edge.

Another object of the invention is to provide a road maintaining machine in which planing means and road material-spreading means are so provided that the planing means and spreading means can be selectively adjusted.

Another object of the invention is to provide a machine in which a tool having a plurality of cutting edges is provided, the tool being supported upon the machine so that the cutting edges can be selectively positioned.

Another object of the invention is to provide a machine including a tool for planing material from a road surface, and thereafter moving planed material back and forth across the road.

Another object of the invention is to provide a machine including a tool for planing material from a road surface, and thereafter moving planed material back and forth across the road while leveling means are provided for finally leveling off material at a selected depth.

Another object of this invention is to provide a machine including a tool for planing material from a road surface, and thereafter moving planed material back and forth across the road while leveling means are provided for finally leveling off material at a selected depth, the machine including an operator's station at which control means are provided for selectively rendering the tool operative and inoperative, for adjusting the cutting angle and the depth of the cut of the tool, and for controlling operation of the leveling means.

Another object of the invention is to provide a road tool having a plurality of cutting edges which can be positioned in a selected plane.

Another object of the invention is to provide a multiple blade road machine in which the cutting edges are adjustable to a very sharp cutting angle whereby ruts and washboard surfaces are eliminated more effectively and whereby the cutting edges are given a longer point of contact with the surface of the ground.

Another object of the invention is to provide a road maintainer which shaves the road-bed below the surface material to eliminate ruts and unevenness and immediately thereafter replaces the surface material in an evenly spread condition during a single traverse of the road, whereby undesirable windrows are eliminated and the road-bed is not left naked of surface material.

The invention possesses numerous other advantageous features and objects, some of which will appear in the following wherein I have disclosed a preferred form of the machine of my invention. It is to be understood that the form disclosed is only that of the preferred machine, and that various other machines embodying my invention can be constructed without departing from my invention.

Vehicle construction

A vehicle main frame 25 (Figs. 1 and 2) is formed of channels, arched over tool 300 to provide a vehicle support therefor, secured together by bracing 26 and bracket 27. Drive wheels 28 are mounted upon main frame 25 and are driven from an internal combustion engine (not shown) enclosed by hood 29. Application of power from the internal combustion engine is controlled by gear shift lever 31 and clutch pedal 32 operating transmission 33 from which power is applied to both wheels 28, transmission 33 not including a differential. Pedal 34, which can be latched in place, is attached to brakes (not shown) associated with wheels 28. Throttle control lever 36 regulates fuel fed to the internal combustion engine.

At the forward end of frame 25, steering wheels 37 are mounted on axle 38 which is hinged relative to frame 25. Wheels 37 (Fig. 2) are hinged about pins 39 extending through axle 38, and are steered by usual automobile steering mechanism which includes drag link 41 extended between arms 42 attached to axle 38. Shaft assembly 43 extends from steering wheel 44 to steering gear assembly 46 which is connected to arms 42 so that rotation of steering wheel 44 is effective to move wheels 37 relative to frame 25 to alter the course of the vehicle. Wishbone 47 is extended from axle 38 and is mounted in subframe 49 secured to main frame 25.

Cab 51 is mounted adjacent arched portion of frame 25 to provide a station for an operator, including seat 52. Lever 31, pedals 32 and 34, throttle control 36, and steering wheel 44 are provided in cab 51 at the operator's station, so that an operator can conveniently and readily control vehicle and tool operation and observe the roadway traversed. Fenders 53 are extended over wheels 28, while bumper 56 is extended across the rear end of frame 25 to protect that end of the vehicle. A draft connection 57 is secured to bumper 56.

*Tool suspension and manipulation*

Tool 300 (Figs. 1, 2, and 3), to be presently described in detail, is attached to beam 101. Said beam 101 is provided with a central semi-circular portion riveted to circle 102 which is supported for rotation in several shoes 103. Two of shoes 103 are secured to cross beam 104, while another shoe 103 is part of mechanism 106 for rotating circle 102. Arms 107 are hinged at one end by bolts 108 on cross beam 104. Brackets 109, secured to cross beam 104, limit movement of arms 107 to oscillatory movement about bolts 108.

Each arm 107 (Figs. 1, 3, 4, and 5) includes an end portion 111 to receive bolt 112. Spring 113 is positioned between washer 114, held on bolt 112 by nut 116, and an end of beam 104. Each arm 107 includes ball member 117 (Figs. 3 and 5) engaged by socket 118 provided on screw 171 of tool lifting and lowering mechanisms generally designated as 119 and to be presently described. Each arm 107 (Fig. 5) includes pin 121 to receive link 122, which extends to center side shift mechanism generally designated as 123 and to be presently described. Apertures 124 (Fig. 5) are provided in beam 104 and arms 107, so that arms 107 can be secured and fastened to beam 104.

Drawbars 126 (Figs. 1 to 4, inclusive) are secured by brackets 127 to cross beam 104. Yoke 128 is extended between drawbars 126 (Fig. 3) and serves as a support for circle rotating mechanism 106. Drawbars 126 extend forwardly and are secured to universal 129. Universal 129 includes member 131 (Fig. 2) connecting the forward ends of drawbars 126 and apertured to receive T-bolt 132 which is mounted for rotation on pin 133 carried in member 134. Member 134 is rotatably mounted in bracket 27 (Fig. 1) and another bracket 136. Since T-bolt 132 can rotate about pin 133 in a vertical plane and since member 134 can rotate in brackets 27 and 136 in a horizontal plane, drawbars 126 are supported for universal movement.

Circle moving mechanism 106 for tool 300 includes housing 141 secured to yoke 128. Shaft 142 drives pinion 143 (Figs. 3 and 11) to engage gear teeth 144 formed upon circle 102 to rotate circle 102 over shoes 103. Housing 141 provides a support for shaft 142 and includes worm wheel 145 and worm 146 (Fig. 11) to supply power from shaft 147. Shaft 147, through universals 148, is connected to power control means 250 (to be presently described). Tool 300 can be shifted by mechanism 106 to occupy various angular positions relative to transverse axis of main frame 25 and the direction of advance of the vehicle. Thus either end of the tool can be placed in leading position and the angular relation of the tool to the line of draft can be varied.

Figures 11, 12, 13, 14:
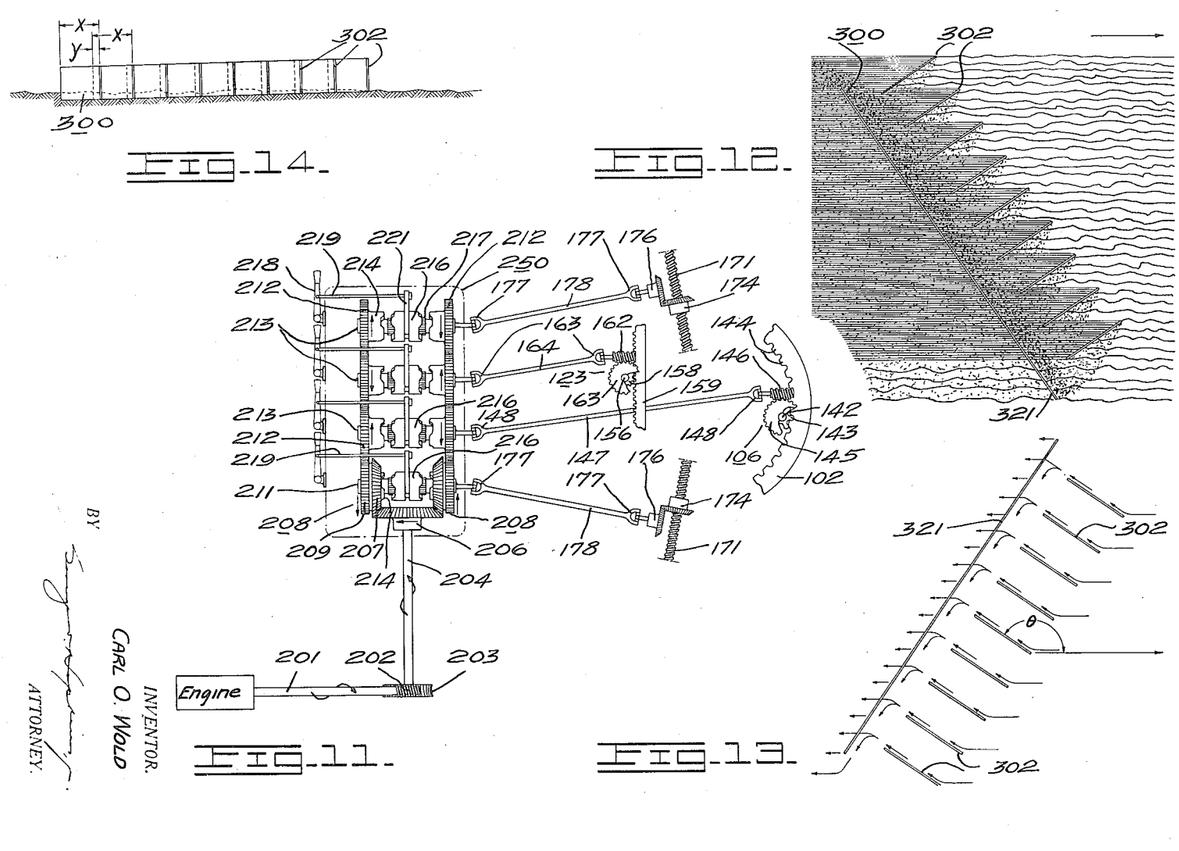
Fig. 11 is a schematic showing of the arrangement of control means for applying power to manipulate and adjust the tool.
Fig. 12 is a diagram illustrating planing and scraping operation of the tool.
Fig. 13 is a view illustrating graphically the relationship between the tool, direction of advance of the machine and delivery of material planed from a road surface.
Fig. 14 is a schematic view illustrating the relationship between overlap of the blades of the tool and the tool to the road surface.

Center side shift mechanism 123 (Figs. 1 and 11) includes shaft 156 supported in housing 157. Pinion 158 is mounted on shaft 156 and engages rack 159 to which link 122 is connected. Rack 159 is supported on cross frame member 161. Housing 157 includes worm 162 engaging worm wheel 163 mounted on shaft 156 (Fig. 11). Worm 162 is rotated by power control means 250 through universals 163 and shaft assembly 164. Shifting movement of rack 159 causes drag link 122 to move drawbars 126 and tool 300 about universal support 129 at the forward end of the machine in a generally horizontal plane to shift tool 300 transversely relative to the axis of main frame 25 and the direction of advance of the vehicle.

Figure 1:
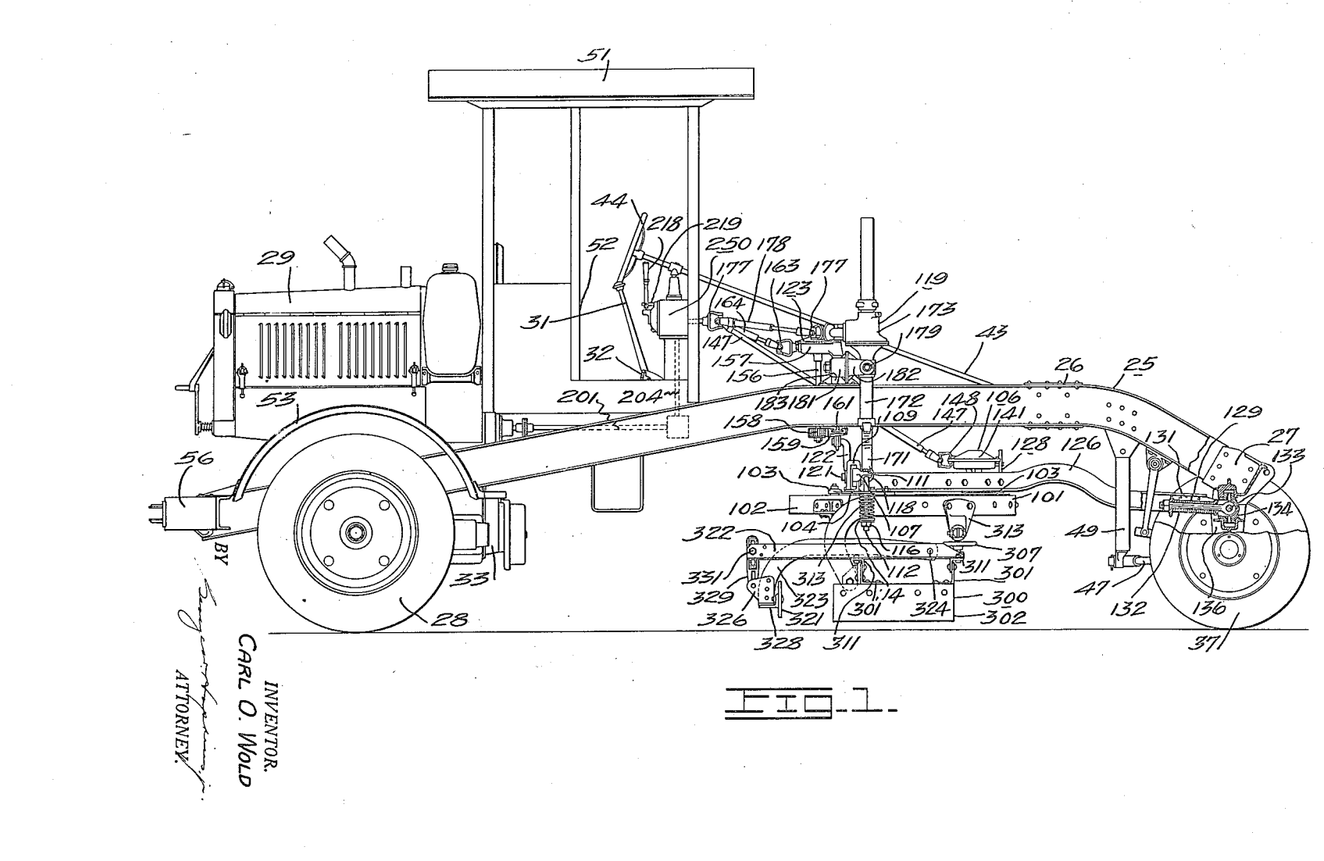
Fig. 1 is a side elevation of the preferred form of the machine.
Figure 2:
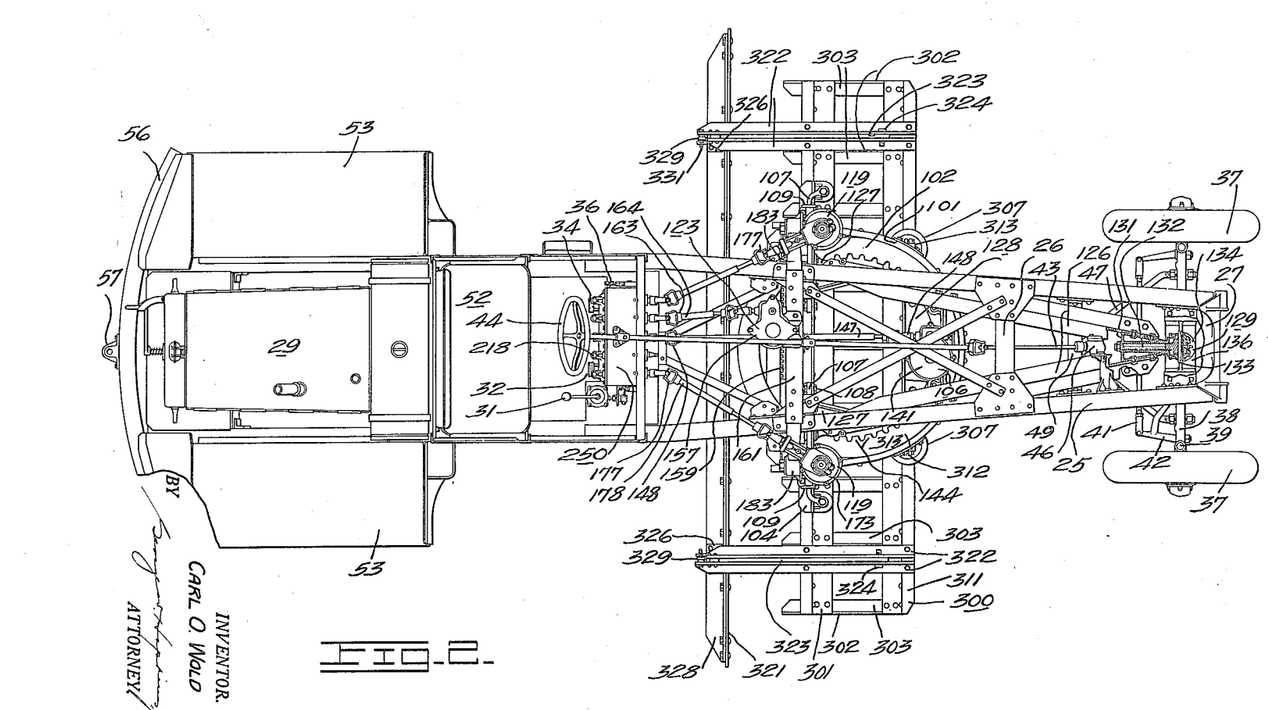
Fig. 2 is a plan view of the machine shown in Fig. 1.

Tool lifting and lowering mechanisms 119 are identical and a description of one will suffice. Socket 118 (Figs. 3 and 5) is formed on an end of screw 171 which extends through shield 172 (Fig. 1). Housing 173 (Figs. 1 and 2) includes pinion nut 174 (Fig. 11) rotated to raise or lower screw 171 by pinion 176 upon application of power through universals 177 and shaft 178 from power control means 250. Housing 173 is mounted for universal movement by trunnions 179 and bearing 181 for yoke 182 in bracket 183.

Mechanisms 119 are operable independently so that one end of tool 300 can be raised or lowered while the other end is relatively stationary thereby adjusting the tool about a longitudinal axis to vary the angular relation between the plane of the cutting edges thereof and a horizontal plane, or both ends can be moved simultaneously in the same or in opposite directions, whereby the depth of cut of the tool is varied. Tool 300 can thus be moved to establish a road surface in a selected plane.

Power control means 250 (Figs. 1 and 11) is connected by countershaft 201, worm 202, worm wheel 203, and shaft 204 to the internal combustion engine (shown diagrammatically in Fig. 11), also providing traction power for the vehicle. Shaft 204 carries pinion 206 which meshes with and rotates pinion gears 207 in opposite directions. Pinion gears 207 are integral with spur gears 209 to form gear assemblies 208. Gear assemblies 208 are rotatably mounted on shaft 211, as are spur gears 212 on shaft 213. Spur gears 209 are engaged with gears 212 which in turn mesh with other gears 212 so that all spur gears are rotated by gears 206 and 207. Spur gears 212 and gear assemblies 208 include hubs 214 formed to provide clutches with members 216 slidable on splined portions 217 on shafts 213 and 211 which are connected to tool operating mechanisms (Fig. 11). Members 216 are shifted by hinged levers 218 and rods 219 connected to forks 221. Selective oscillation of any one of levers 218 results in connection of a rotating and driven spur gear with the shaft on which the spur gear is rotating so that power is supplied to move a selected one of the tool manipulating mechanisms (Fig. 11) in a selected and desired direction. Members 216 are so formed that when a tool operating mechanism has reached its limit of travel, the lever 218 controlling that adjustment will be forced from the operator's hand, and the tool operating mechanism cannot be jammed or harmed by attempted movement beyond that which the tool operating mechanism is capable.

Power control means 250 and levers 218 are provided adjacent steering wheel 44 (Figs. 1 and 2), so that all controls for the machine are convenient to the operator.

Construction of tool

Figure 3:
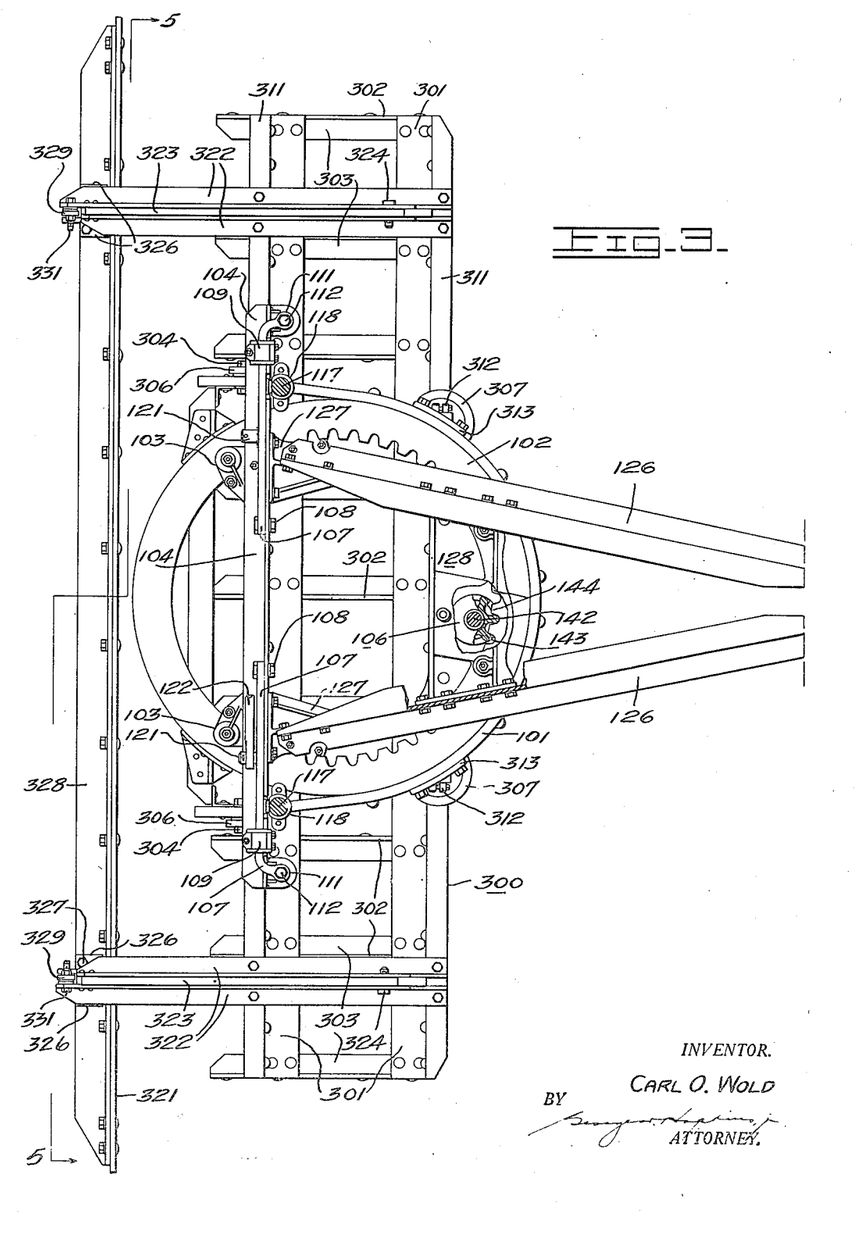
Fig. 3 is a plan view of the tool.
Figures 4, 6, 7, 8, 9, 10:
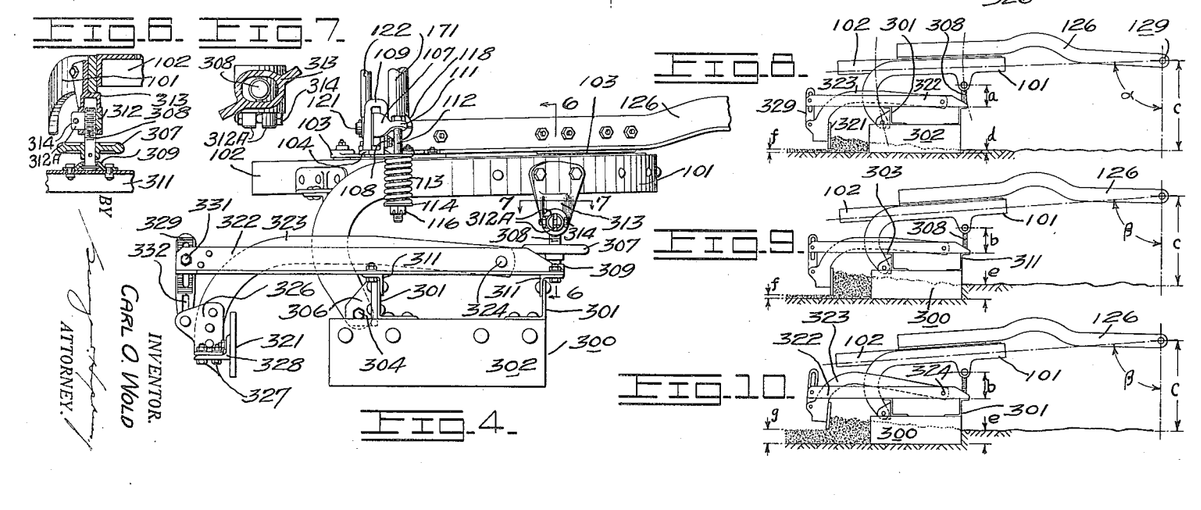
Fig. 4 is a side elevation of the tool and a portion of the means for supporting the tool.
Fig. 6 is a section along the line 6—6 of Fig. 4.
Fig. 7 is a section along the line 7—7 of Fig. 4.
Figs. 8 to 10, inclusive, are diagrammatic showings of the tool illustrating several operations that the tool can perform.
Figure 5:
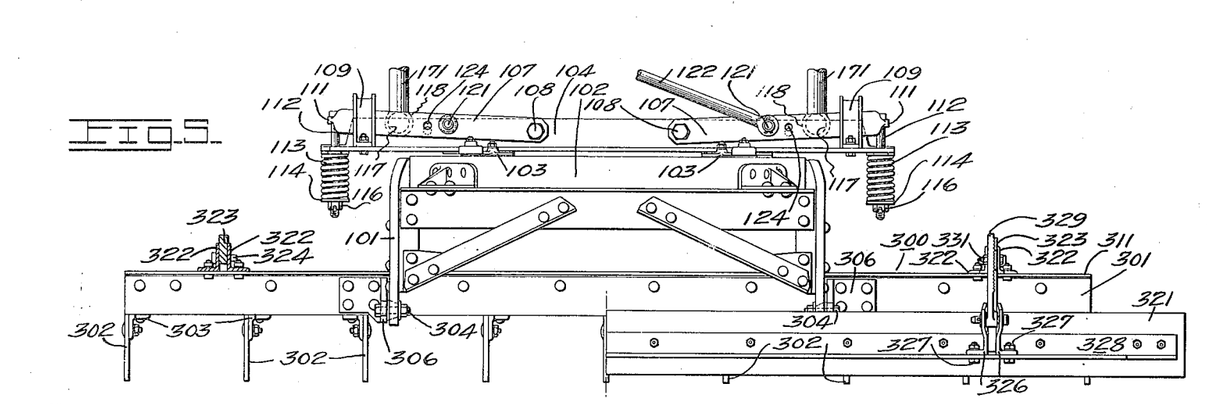
Fig. 5 is a section along the line 5—5 of Fig. 3.

The tool comprises a multiple blade assembly including planing means and means for leveling and distributing planed material. Tool 300 comprises angles 301 (Figs. 1, 2, 3, 4, and 5) to which a plurality of blades 302 are attached by angles 303 (Fig. 5). Blades 302 have cutting edges to plane a road surface, the cutting edges all lying in a plane. The length of blades 302 and the distance between them along angles 301 is such that when angles 301 are turned at an angle to the direction of advance of the machine, the surface cut by one blade 302 will overlap the surface cut by an adjacent blade 302. The ends of beam 101 extend tangentially and downwardly from circle 102 and are hinged on angles 301 by bolts 304 extending through brackets 306 (Fig. 5). Angular adjustment of blades 302, in addition to that provided by mechanisms 119, is secured by hand wheels 307 (Figs. 2, 3, 4, and 6) attached to threaded shafts 308 so that tool 300 can be adjusted relative to drawbars 126. An end of each shaft 308 is secured for rotation by plates 309 riveted onto angles 311 (Fig. 6) secured to angles 301 (Fig. 4). Shafts 308 are engaged by clamping nuts 312 (Figs. 6 and 7) pivoted in apertured bosses in brackets 313 fastened onto circle 102. Each nut 312 is bifurcated to provide clamping extensions 312A (Figs. 6 and 7) which extend through an aperture in the associated bracket 313 and are apertured to receive clamping bolt 314 whereby said nut 312 may be clamped tightly around shaft 308 to hold said shaft in adjusted position. Said extensions 312A also serve to prevent rotation of nut 312.

Tool 300 also includes spreader blade 321 extended across the machine and supported by circle 102. Angles 301 are joined by pairs of angles 322 which extend beyond blades 302, and are fastened to angles 311. Pairs of angles 322 are spaced apart to provide a support for arms 323 hinged by bolts 324 (Fig. 3). Arms 323 are fastened to brackets 326 held by bolts 327 on angles 328 which are secured along the back of spreader blade 321 (Fig. 5). Spreader blade 321 can be moved by arms 323, attached to spreader blade 321 by angles 328, about the hinged point provided by bolts 324, and secured after movement by serrated arms 329 held in engagement with cooperative serrations provided on angles 322 by bolts 331. Suitable longitudinal slots in arms 329 (Fig. 4) permit limited free oscillation of spreader 321.

Adjustment and operation

In operation, the position of blades 302 and spreader blade 321 can be varied, and the blades selectively positioned as desired. In schematic views shown in Figs. 8 to 10, inclusive, I have shown some of the positions in which blades 302 and spreader 321 can be placed. Thus, while the distance between the forward end of drawbars 126 and the ground surface is a fixed distance, the angle between drawbars 126 and the ground can be varied by employing the lifting and lowering mechanisms 119. Thus, the drawbar angle can be changed from $\alpha$ (Fig. 8) to $\beta$ (Figs. 9 and 10). The amount that the blades 302 scrape and plane the road surface is also increased from distance $d$ (Fig. 8) to distance $e$ (Figs. 9 and 10). Although the angle of drawbars 126 has been changed from $\alpha$ to $\beta$, the blades 302 and 321 can be adjusted to cut in a horizontal plane. Thus, the effective length of threaded shafts 308 has been changed from $a$ (Fig. 8) to $b$ (Figs. 9 and 10) and the tool is horizontal.

If desired, the amount of material spread by blade 321, over the area scraped and planed by blades 302, can be varied by moving blade 321 about the axis of bolts 324. Thus, the effective depth of spread of blade 321 can be varied as from $f$ (Figs. 8 and 9) to $g$ (Fig. 10).

Rotation of circle 102 is effective to vary the cutting relationship between blades 302 and the road surface and the direction of delivery of material from spreader blade 321. Rotation of circle 102 is also effective to vary the amount of overlap of blades 302. As appears in Fig. 13, with blades 302 positioned at angle $\theta$ to the direction of advance of the machine, planed material is delivered back along the face of each blade 302 in one direction, and is thereafter transferred by spreader blade 321 in the opposite direction across the machine, a portion of the material being released by being spread over the road, while another portion is delivered off the end of the blade 321. Circle 102 permits tool 300 to be moved to vary angle $\theta$ so that tool 300 can be positioned at various angles. Thus, as appears in Fig. 12, tool 300 can be moved so as to deliver material to the other end of blade 321 while working material back and forth over the road surface.

Fig. 12 represents schematically what happens upon advance of tool 300 over a road surface. In this view, the wavy lines represent the road surface which the tool has not worked upon, while the straight lines indicate that area over which tool 300 has planed and spread material. The dots represent distribution of planed and spread material. From the relationship of the straight lines in Fig. 12, it will be observed that each blade 302 overlaps, or is overlapped by, an adjacent blade. This appears also in Fig. 14 where the distance $x$ represents the projected effective cutting width of angularly positioned blades 302 and distance $y$ the amount that the effective widths overlap. While overlapping of the blades reduces the total length of effective cutting face of tool 300, it ensures that the whole of the roadway will be cut (no uncut ridges being left) and that planed material will be thoroughly intermixed and worked. Thus, the machine includes a tool having a plurality of cutting edges in a plane and a spreader to spread selectively while working material in a direction other than that direction in which it is planed.

Lifting and lowering mechanisms 119 also make it possible for different depths to be planed and spread. Thus, one end of tool 300 (Fig. 14) can be lower than the other so as to establish a road surface at an angle to the horizontal.

Center side shift mechanism 123 enables tool 300 to be moved transversely, from one side to another, so that tool 300 can be selectively positioned to plane and spread on a selected side of the machine and beyond the machine. Power control means 250, convenient to the operator, enable all major adjustments of tool 300 to be quickly made by selective application of power from the engine of the vehicle.

The various adjusting means all contribute to the provision of a multiple blade tool which is operable to establish a desired road surface by planing and resurfacing. Not only must the tool be universally adjustable to accomplish this end, but the adjusting means must be capable of maintaining the tool in adjusted position irrespective of the condition of the road surface. This is a very essential feature and it is to be noted that the adjusting means disclosed herein not only provide the necessary adjustments for a multiple blade tool of universal application but also serve to maintain the tool rigidly in adjusted position.

Springs 113 and hinged arms 107 provide a connection which prevents and dampens out chattering of tool 300. Chattering is undesirable because it is harmful to the machine generally and causes tool 300 to operate unevenly. When chattering is eliminated a continuous, smooth surface is formed by the tool. The arms 107 and springs 113 to eliminate chatter can be applied to tools, other than the one specifically disclosed.

I, therefore, claim as my invention:

1. In a road machine for planing and resurfacing a road during traverse thereof, a tool support, a tool frame, planing means and distributing means connected to said frame, means to adjust said planing means to a position parallel with the finished road surface comprising adjustable connections, each connection including a threaded member connected to said support and a threaded member connected to said frame, and means to adjust said distributing means to create a road surface in a selected plane including a serrated arm adapted to have varying lengths thereof connecting said frame and said distributing means.

2. In a road machine for planing and resurfacing a road during traverse thereof, a tool support, a tool frame, planing means and distributing means connected to said frame, means to adjust said planing means to a position parallel with the finished road surface comprising aligned pivotal connections between said support and said frame and aligned adjustable connections therebetween, and means to adjust said distributing means to create a road surface in a selected plane comprising aligned pivotal connections between said distributing means and said frame, and aligned adjustable connections therebetween.

3. In a road machine, a tool supporting framework, a tool having a pivotal connection with said framework and an adjustable connection therewith, said tool comprising a multiple blade assembly including cross angles, braces connecting said cross angles, a plurality of parallel blades secured to said cross angles, a leveling blade, a pair of arms each secured at one end to said leveling blade near the opposite ends thereof and pivotally connected at the other to said braces adjacent the forward ends thereof, and adjustable connections between the rear ends of said braces and said leveling blade, each comprising a slotted arm pivoted to said leveling blade and having a serrated face adapted to engage corresponding serrations on an associated brace, and a bolt passing through said associated brace and engaging the slot in said arm.

4. In a road machine, a tool support, a tool including planing means having a plurality of cutting edges, means for adjusting the depth of cut of said planing means, and means for maintaining said cutting edges parallel to the finished surface of the road comprising adjustable connections between said tool and said tool support, each connection including a threaded member pivotally and non-rotatably connected to said support, a second threaded member universally connected to said tool, and manually operable means for rotating said second member to relatively adjust said members.

5. In a road machine, a tool support, a tool including planing means having a plurality of cutting edges, means for adjusting the depth of cut of said planing means, and means for maintaining said cutting edges parallel to the finished surface of the road comprising adjustable connections between said tool and said tool support, each connection including a threaded member secured to said support, a second threaded member secured to said tool and having threaded engagement with said first member, and means for clamping said threaded members in adjusted position.

6. In a road machine, a tool support, a tool including planing means having a plurality of cutting edges, means for adjusting the depth of cut of said planing means, and means for maintaining said cutting edges parallel to the finished surface of the road comprising adjustable connections between said tool and said tool support, each connection including a threaded member pivotally and non-rotatably connected to said support, a second threaded member pivotally connected to said tool, manually operable means for rotating said second member to relatively adjust said members, and means for clamping said threaded members in adjusted position.

7. In a road machine, a tool support, a tool including planing means having a plurality of cutting edges, means for adjusting the depth of cut of said planing means, and means for maintaining said cutting edges parallel to the finished surface of the road comprising adjustable connections between said tool and said tool support, each connection including a threaded member secured to said support and a second threaded member secured to said tool, one of said members comprising a screw adapted for manual operation, and the other of said members comprising a nut having spaced apertured extensions and a clamping bolt engaging said extensions whereby said nut is adapted to be clamped in adjusted position on said screw.

8. In a road machine for planing and resurfacing a road during traverse thereof, a frame, a tool having a draft connection with said frame comprising planing means including a plurality of cutting edges lying in a plane and distributing means having a fixed angular relation with respect to said planing means, means for adjusting said tool to establish a desired road surface, comprising means for positioning and maintaining said tool in position to make a cut of selected depth, means for positioning said tool laterally with respect to said frame whereby any one of a plurality of parallel paths are adapted to be planed and resurfaced thereby, means for leveling said tool to position said cutting edges in a plane parallel to the plane of the desired road surface, and means for adjusting said distributing means vertically with respect to said planing means to create a road surface parallel to the plane of said cutting edges.

9. In a road machine for planing and resurfacing a road during traverse thereof, a frame, a tool having a draft connection with said frame comprising planing means including a plurality of cutting edges lying in a plane and distributing means having a fixed angular relation with respect to said planing means, means for adjusting said tool to establish a desired road surface, comprising means for positioning and maintaining said tool in position to make a cut of selected depth, means for leveling said tool to position said cutting edges in a plane parallel to the plane of the desired road surface, and means for adjusting said distributing means vertically with respect to said planing means to create a road surface parallel to the plane of said cutting edges.

10. In a road machine for planing and resurfacing a road during traverse thereof, a frame having front and rear supports, a tool having a draft connection with said frame comprising a sub-frame having a plurality of parallel cutting edges secured thereto and a leveling blade connected to said sub-frame, means for positioning said tool to establish a desired road surface, comprising means for adjusting said tool about a longitudinal axis to vary the angular relation between the plane of said cutting edges and a horizontal plane, means for adjusting said tool laterally to engage the road in any one of a plurality of paths parallel to the direction of travel of the machine, and means for adjusting said leveling blade vertically with respect to said sub-frame to create a road surface in a selected plane parallel to the plane of said cutting edges.

11. In a road machine for planing and resurfacing a road during traverse thereof, a frame having front and rear supports, a tool having a draft connection with said frame comprising a sub-frame having a plurality of parallel cutting edges secured thereto and a leveling blade connected to said sub-frame, means for positioning said tool to establish a desired road surface, comprising means for adjusting said tool laterally to engage the road in any one of a plurality of paths parallel to the direction of travel of the machine, and means for adjusting said leveling blade vertically with respect to said sub-frame to create a road surface in a selected plane parallel to the plane of said cutting edges.

12. In a road machine for planing and resurfacing a road during traverse thereof, a frame having front and rear supports, a tool having a draft connection with said frame comprising a sub-frame having a plurality of parallel cutting edges secured thereto and a leveling blade connected to said sub-frame, means for positioning said tool to establish a desired road surface, comprising means for adjusting said tool about a longitudinal axis to vary the angular relation between the plane of said cutting edges and a horizontal plane, means for adjusting said tool laterally to engage the road in any one of a plurality of paths parallel to the direction of travel of the machine, means for varying the angle of said cutting edges with respect to the line of draft, and means for adjusting said leveling blade vertically with respect to said sub-frame to create a road surface in a selected plane parallel to the plane of said cutting edges.

13. In a road machine for planing and resurfacing a road during traverse thereof, a frame having front and rear supports, a tool having a draft connection with said frame comprising a sub-frame having a plurality of parallel cutting edges secured thereto and a leveling blade connected to said sub-frame, means for positioning said tool to establish a desired road surface, comprising means for adjusting said tool laterally to engage the road in any one of a plurality of paths parallel to the direction of travel of the machine, means for varying the angle of said cutting edges with respect to the line of draft, and means for adjusting said leveling blade vertically with respect to said sub-frame to create a road surface in a selected plane parallel to the plane of said cutting edges.

14. In a road machine for planing and resurfacing a road during traverse thereof, a frame having front and rear supports, a tool having a draft connection with said frame comprising a sub-frame having a plurality of parallel cutting edges secured thereto and a leveling blade connected to said sub-frame, means for positioning said tool to establish a desired road surface, comprising means for adjusting said tool about a longitudinal axis to vary the angular relation between the plane of said cutting edges and a horizontal plane, means for adjusting said tool laterally to engage the road in any one of a plurality of paths parallel to the direction of travel of the machine, means for varying the angle of said cutting edges with respect to the line of draft, means for adjusting said tool about a transverse axis to vary the angular relation between the plane of said cutting edges and a horizontal plane, and means for adjusting said leveling blade vertically with respect to said sub-frame to create a road surface in a selected plane parallel to the plane of said cutting edges.

15. In a road machine for planing and resurfacing a road during traverse thereof, a frame having front and rear supports, a tool having a draft connection with said frame comprising a sub-frame having a plurality of parallel cutting edges secured thereto and a leveling blade connected to said sub-frame, means for positioning said tool to establish a desired road surface, comprising means for adjusting said tool laterally to engage the road in any one of a plurality of paths parallel to the direction of travel of the machine, means for varying the angle of said cutting edges with respect to the line of draft, means for adjusting said tool about a transverse axis to vary the angular relation between the plane of said cutting edges and a horizontal plane, and means for adjusting said leveling blade vertically with respect to said sub-frame to create a road surface in a selected plane parallel to the plane of said cutting edges.

16. In a road machine for planing and resurfacing a road during traverse thereof, a frame having front and rear supports, a tool having a draft connection with said frame, comprising a plurality of parallel cutting edges lying in a plane and adapted to plane material from the surface of the road and work it in a selected direction and a leveling and distributing blade adapted to receive planed material from said cutting edges to work said material in the opposite direction while creating a road surface in a selected plane, means for positioning said tool to establish a desired road surface, comprising means for adjusting said tool about a longitudinal axis to vary the angular relation between the plane of said cutting edges and a horizontal plane, means for positioning and maintaining either end of said tool in leading position, means for positioning and maintaining said cutting edges in a plane parallel to the plane of the desired road surface, and means for adjusting said leveling and distributing blade vertically with respect to said cutting edges to create a road surface in a selected plane parallel to the plane of said cutting edges.

17. In a road machine for planing and resurfacing a road during traverse thereof, a frame having front and rear supports, a tool having a draft connection with said frame, comprising a plurality of parallel cutting edges lying in a plane and adapted to plane material from the surface of the road and work it in a selected direction and a leveling and distributing blade adapted to receive planed material from said cutting edges to work said material in the opposite direction while creating a road surface in a selected plane, means for positioning said tool to establish a desired road surface, comprising means for positioning and maintaining either end of said tool in leading position, means for positioning and maintaining said cutting edges in a plane parallel to the plane of the desired road surface, and means for adjusting said leveling and distributing blade vertically with respect to said cutting edges to create a road surface in a selected plane parallel to the plane of said cutting edges.

18. In a road machine for planing and resurfacing a road during traverse thereof, a frame having front and rear supports, a tool having a draft connection with said frame, comprising a plurality of parallel cutting edges lying in a plane and adapted to plane material from the surface of the road and work it in a selected direction and a leveling and distributing blade adapted to receive planed material from said cutting edges to work said material in the opposite direction while creating a road surface in a selected plane, means for positioning said tool to establish a desired road surface, comprising means for adjusting said tool about a longitudinal axis to vary the angular relation between the plane of said cutting edges and a horizontal plane, means for positioning and maintaining said cutting edges in a plane parallel to the plane of the desired road surface, and means for adjusting said leveling and distributing blade vertically with respect to said cutting edges to create a road surface in a selected plane parallel to the plane of said cutting edges.

19. In a road machine for planing and resurfacing a road during traverse thereof, a frame having front and rear supports, a tool having a draft connection with said frame, comprising a plurality of parallel cutting edges lying in a plane and adapted to plane material from the surface of the road and work it in a selected direction and a leveling and distributing blade adapted to receive planed material from said cutting edges to work said material in the opposite direction while creating a road surface in a selected plane, means for positioning said tool to establish a desired road surface, comprising means for positioning and maintaining said cutting edges in a plane parallel to the plane of the desired road surface, and means for adjusting said leveling and distributing blade vertically with respect to said cutting edges to create a road surface in a selected plane parallel to the plane of said cutting edges.

20. In a road machine for planing and resurfacing a road during traverse thereof, a frame having front and rear supports, a tool having a draft connection with said frame, comprising a plurality of parallel cutting edges lying in a plane and adapted to plane material from the surface of the road and work it in a selected direction and a leveling and distributing blade adapted to receive planed material from said cutting edges to work said material in the opposite direction while creating a road surface in a selected plane, means for positioning said tool to establish a desired road surface, comprising means for positioning and maintaining either end of said tool in leading position, means for positioning and maintaining said cutting edges in a plane parallel to the plane of the desired road surface, means for adjusting said leveling and distributing blade vertically with respect to said cutting edges to create a road surface in a selected plane parallel to the plane of said cutting edges, and means for adjusting either end of said tool vertically to vary the angular relation of the plane of said cutting edges to a horizontal plane.

21. In a road machine for planing and resurfacing a road during traverse thereof, a frame having front and rear supports, a tool having a draft connection with said frame, comprising a plurality of parallel cutting edges lying in a plane and adapted to plane material from the surface of the road and work it in a selected direction and a leveling and distributing blade adapted to receive planed material from said cutting edges to work said material in the opposite direction while creating a road surface in a selected plane, means for positioning said tool to establish a desired road surface, comprising means for positioning and maintaining said cutting edges in a plane parallel to the plane of the desired road surface, means for adjusting said leveling and distributing blade vertically with respect to said cutting edges to create a road surface in a selected plane parallel to the plane of said cutting edges, and means for adjusting either end of said tool vertically to vary the angular relation of the plane of said cutting edges to a horizontal plane.

22. In a road machine, a tool support, a tool including planing means having a plurality of cutting edges, means for adjusting the depth of cut of said planing means, and means for maintaining said cutting edges parallel to the finished surface of the road comprising adjustable connections between said tool and said tool support, each connection including members having threaded engagement, means on one of said members for relatively adjusting said members, and means for clamping said members in adjusted position.

23. In a road machine for planing and resurfacing a road during traverse thereof, a frame having front and rear supports, a tool support having a draft connection with said frame, a tool, comprising a plurality of parallel cutting edges lying in a plane and adapted to plane material from the surface of the road and work it in a selected direction and a leveling and distributing blade adapted to receive planed material from said cutting edges to work said material in the opposite direction while creating a road surface in a selected plane, means for positioning said tool to establish a desired road surface, comprising aligned pivotal connections between said tool support and said tool, means for adjusting said tool about the axis of said pivotal connections for positioning and maintaining said cutting edges in a plane parallel to the plane of the desired road surface, and means for adjusting said leveling and distributing blade vertically with respect to said cutting edges to create a road surface in a selected plane parallel to the plane of said cutting edges.

24. In a road machine for planing and resurfacing a road during traverse thereof, a frame having front and rear supports, a tool support having a draft connection with said frame, a tool, comprising a sub-frame having a plurality of parallel cutting edges lying in a plane and adapted to plane material from the surface of the road and work it in a selected direction and a leveling and distributing blade adapted to receive planed material from said cutting edges to work said material in the opposite direction while creating a road surface in a selected plane, means for positioning said tool to establish a desired road surface, comprising aligned pivotal connections between said tool support and said tool, means for adjusting said tool about the axis of said pivotal connections for positioning and maintaining said cutting edges in a plane parallel to the plane of the desired road surface, second aligned pivotal connections between said leveling and distributing blade and said sub-frame, and means for adjusting said blade about the axis of said second pivotal connections to create a road surface in a selected plane parallel to the plane of said cutting edges.

25. In a road machine for planing and resurfacing a road during traverse thereof, a frame having front and rear supports, a tool having a draft connection with said frame, comprising a plurality of parallel cutting edges lying in a plane and adapted to plane material from the surface of the road and work it in a selected direction and a leveling and distributing blade adapted to receive planed material from said cutting edges to work said material in the opposite direction while creating a road surface in a selected plane, means for positioning said tool to establish a desired road surface, comprising means for positioning and maintaining either end of said tool in leading position, and means for adjusting said leveling and distributing blade vertically with respect to said cutting edges to create a road surface in a selected plane parallel to the plane of said cutting edges.

26. In a road machine for planing and resurfacing a road during traverse thereof; a frame; a tool having a draft connection with said frame; said tool comprising a sub-frame having a plurality of parallel cutting edges secured thereto and adapted to plane material from the surface of the road and work it in a selected direction, and a leveling and distributing member disposed rearwardly of said cutting edges to receive planed material therefrom and to work said material in the opposite direction while creating the desired road surface, said cutting edges being normal to said sub-frame and normal to said leveling and distributing member, whereby said tool is adapted to have either end thereof placed in leading position; and means for positioning said tool to establish a desired road surface, comprising means for adjusting the depth of cut of said tool, and means mounting said tool for adjustment to place either end thereof in leading position.

27. In a road machine for planing and resurfacing a road during traverse thereof; a frame; a tool having a draft connection with said frame; said tool comprising a sub-frame having a plurality of parallel cutting edges secured thereto and adapted to plane material from the surface of the road and work it in a selected direction, and a leveling and distributing member spaced rearwardly of said cutting edges and extending the entire length of said sub-frame in operative relation with all said cutting edges to receive planed material therefrom and to work said material in the opposite direction while creating the desired road surface, said cutting edges being normal to said sub-frame and normal to said leveling and distributing member, whereby said tool is adapted to have either end thereof placed in leading position; and means for positioning said tool to establish a desired road surface, comprising means for adjusting the depth of cut of said tool, and means mounting said tool for adjustment to place either end thereof in leading position, said tool being adjustable to vary the angular relation between the plane of said cutting edges and a horizontal plane.

28. In a road machine; a tool support; a tool, including planing means having a plurality of cutting edges, a leveling and distributing member, aligned pivotal connections between said leveling and distributing member and said planing means, and adjustable connecting means between said leveling and distributing member and said planing means, said pivotal connections and said adjustable connecting means providing for vertical adjustment of said member to any selected one of a plurality of fixed positions with respect to said planing means.

29. In a road machine; a tool supporting framework; a tool mounted on said framework, said tool comprising a sub-frame, a plurality of cutting edges secured to said sub-frame, a leveling member, spaced parallel arms supporting said member adjacent one set of similar ends thereof, aligned pivotal connections between said arms and said sub-frame, and adjustable connections between said arms and said sub-frame, said pivotal and adjustable connections providing for vertical adjustment of said member to any selected one of a plurality of fixed positions with respect to said sub-frame and said cutting edges.

CARL O. WOLD.